No. 791,340. PATENTED MAY 30, 1905.
J. E. HADLEY.
SPEED INDICATOR.
APPLICATION FILED JAN. 23, 1904. RENEWED APR. 3, 1905.
2 SHEETS—SHEET 2.
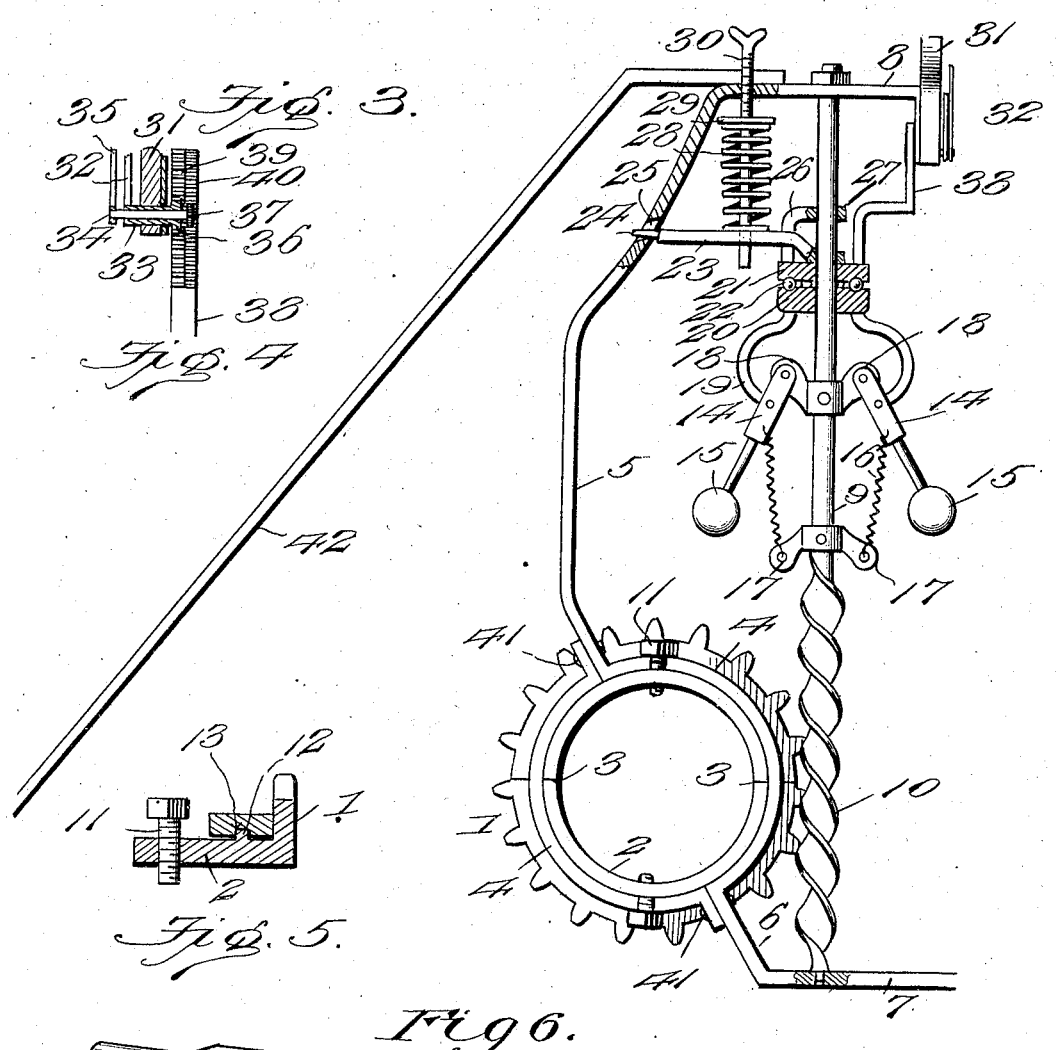

No. 791,340. PATENTED MAY 30, 1905.
J. E. HADLEY.
SPEED INDICATOR.
APPLICATION FILED JAN. 23, 1904. RENEWED APR. 3, 1905.
2 SHEETS—SHEET 1.
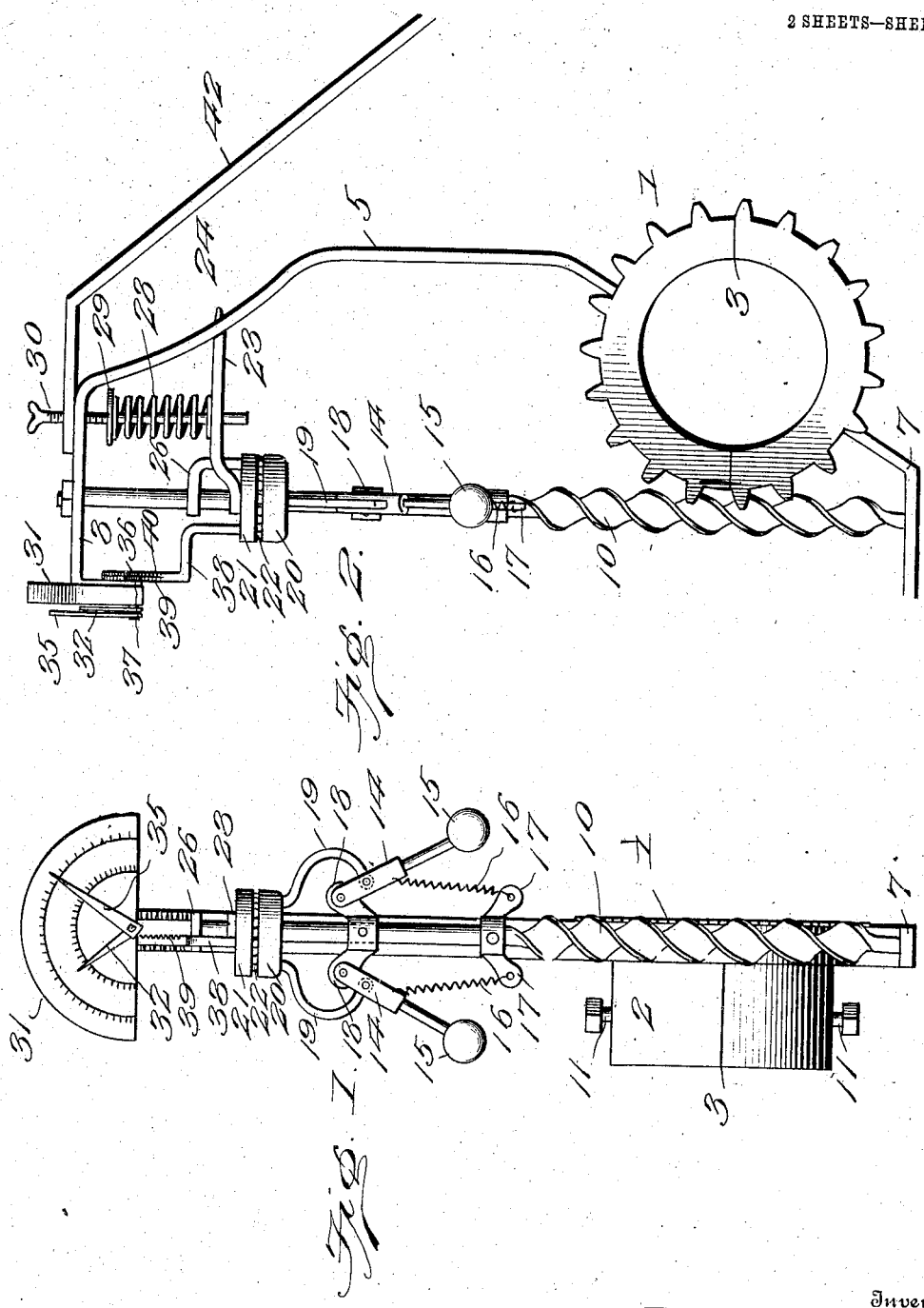

No. 791,340.

Patented May 30, 1905.

UNITED STATES PATENT OFFICE.

JAMES E. HADLEY, OF CEDARBLUFFS, NEBRASKA.

SPEED-INDICATOR.

SPECIFICATION forming part of Letters Patent No. 791,340, dated May 30, 1905.

Application filed January 23, 1904. Renewed April 3, 1905. Serial No. 253,603.

*To all whom it may concern:*

Be it known that I, JAMES E. HADLEY, a citizen of the United States, residing at Cedarbluffs, in the county of Saunders and State of Nebraska, have invented new and useful Improvements in Speed-Indicators, of which the following is a specification.

This invention relates to speed-indicators, the object in view being to provide a simple and reliable device which may be applied to any rotary shaft for the purpose of indicating by the number of revolutions the speed at which said shaft is being driven.

A further object of the invention is to provide means whereby the rate of speed in miles or fractions of a mile may be indicated simultaneously with the indication of the number of revolutions of the shaft or axle to which the device is connected.

The speed-indicator is adapted to be applied to the shafts or axles of cars, locomotives, wagons, and vehicles of all kinds, as well as the shafts of stationary and marine engines. When attached to a stationary engine, the device of course indicates only the number of revolutions of the shaft; but where attached to the shafts or axles of moving vehicles the device also indicates in miles the speed at which such vehicle is moving.

With the above and other objects in view, the nature of which will more fully appear as the description proceeds, the invention consists in the novel construction, combination, and arrangement of parts, as hereinafter fully described, illustrated, and claimed.

In the accompanying drawings, Figure 1 is a front elevation of a speed-indicator constructed in accordance with the present invention. Fig. 2 is a side elevation of the same. Fig. 3 is a sectional elevation looking toward the opposite side from Fig. 2. Fig. 4 is an enlarged detail sectional elevation showing the means for simultaneously operating the two indicating-hands. Fig. 5 is a detail sectional view showing the engagement between the hub of the sectional gear and the gear-retaining band or boxing. Fig. 6 is a detail view of the presser-bar.

Like reference-numerals designate corresponding parts in all figures of the drawings.

In carrying out the present invention I employ a sectional gear 1, embodying a hub 2, the said gear, together with its hub, being divided diametrically, as shown at 3, so that the two parts of the gear may be associated with and applied to the shaft of which the speed is to be indicated without the necessity of slipping the gear over one end of the shaft or removing any of the wheels or other attachments mounted on the shaft. The two parts of the gear-wheel are held together by a gear-retaining band or boxing, consisting of similar halves or sections 4, each substantially semicircular in shape and extending half-way around the hub 2 of the wheel, as shown in Fig. 3. One-half of the gear-retaining band or boxing 4 is preferably formed as an integral part of the frame of the device, said frame comprising an upwardly-extending portion 5 and a downwardly-extending portion 6, the extremities of the two portions of the frame being extended outward to form bracket-arms 7 and 8, which lie substantially in parallel planes and form bearings for the opposite ends of a worm-shaft 9, the latter being provided with a worm 10, which meshes directly with and is driven by the teeth of the gear 1, above referred to.

The hub 2 is provided at a number of points with screws 11 for fastening the gear to a shaft or axle or wheel-hub. The hub 2 is also provided with one or more projections or keys 12, which work in a groove or guideway 13, formed in the inner surface of the sections 4 of the gear-retaining band or boxing hereinabove described, said arrangement serving to prevent the shifting of the gear-wheel, said wheel being thus securely retained in place and in proper relation to the frame of the machine, while at the same time it is free to rotate with the shaft or axle to which it has been applied.

In its rotation the gear-wheel 1 imparts rotary motion to the worm 10, and thereby to the shaft 9 and also to a governor mounted upon said shaft. The governor is constructed in a manner similar to governors now in use and comprises a plurality of governor-arms 14, provided with end weights 15 and, if desired, connected with controlling-springs 16, having their opposite ends attached to lugs 17 on the shaft 9. The inner ends of the arms 14 are pivotally connected to lugs 18 on the shaft 9 and have pivotally connected therewith links 19, the opposite ends of which connect with a rotary head 20, which is slidable up and down on the shaft 9 and which rotates therewith. Arranged above the rotary head 20 is a runner or traveler 21, adapted to move up and down on the shaft 9. The adjacent faces of the head and runner are provided with grooves or ball-races in which are balls 22, thus forming a ball-bearing between the rotary head and the vertically-reciprocating runner or traveler. Bearing against the upper side of the runner 21 is one end of a presser-bar 23, having at its outer end a pintle 24, which is received in a slot or opening 25 in the frame-bar 5. The inner end of the presser-bar 23 is bifurcated, so as to straddle a guide 26, extending upward from the runner 21, the upward end of said guide being bent inward and provided with a sleeve or collar 27, through which the shaft 9 passes. By the arrangement just described the runner may move up and down, but is prevented from rotating.

Arranged above the presser-bar 23 is a tension-spring 28, which bears upon the presser-bar at its lower end, the upper end of said spring being seated against a flange or shoulder 29 on a tension-screw 30, which is threaded through the upper portion of the frame, as shown, and which has its lower extremity extended through an opening in the presser-bar 23. By turning the screw 30 the spring 28 is compressed or relieved, and by thus changing the tension of said spring the pressure of the presser-bar 23 against the runner 21 is regulated for the purpose of giving the proper movement to the hands across the dial, to be now described.

Connected to the outer projecting portion of the upper part of the frame is a dial 31, having two rows of graduations and over the surface of which two independently-movable hands are adapted to move for indicating, respectively, the number of revolutions of the shaft and the rate of speed at which the vehicle is moving. One of the hands 32 is mounted on a tubular shaft 33, which surrounds another shaft, 34, upon the outer extremity of which the remaining indicating-hand 35 is mounted. The two shafts extend through a suitable bearing in the lower portion of the dial 31, and at the inner side of said dial the said shafts are provided with pinions 36 and 37 of different sizes. The pinions are actuated by means of a rack-bar 38, the same being shown as provided with two series of teeth 39 and 40, one set of teeth meshing with the pinion 36, while the other set meshes with the pinion 37. The rack-bar 38 extends downward and is connected fixedly to the runner 21, whereby said rack-bar is moved upward and downward, such movement being controlled by the governor, which is in turn influenced by the rapidity of rotation of the shaft 9 as the latter is actuated by the gear 1, applied to and rotating with the shaft or axle the speed of which is to be indicated.

In applying the indicating device to a shaft or axle it is only necessary to remove the screws or bolts 41, which fasten the sections 4 of the gear-retaining band or boxing together. This allows the two sections of the gear 1 to be separated and applied to the shaft or axle, after which they are held together by the two parts of the gear-retaining band after the latter have been again secured together by means of the screws or bolts 41.

The frame of the machine may be connected to a vehicle, locomotive, or engine in any convenient manner and may also be provided with an additional brace 42, one end of which is connected to the frame of the speed-indicator and the other end of which may be fastened to any convenient part of the vehicle, machine, or engine.

The relative sizes of the pinions 36 and 37 and the rack-sections 39 and 40 may be changed, and the number of teeth on said parts may be varied to suit the engine or vehicle to which the speed-indicating device is to be applied. In this way one of the hands may be made to indicate the number of revolutions of the shaft or axle to which the gear 1 is applied, while the other hand may be made to indicate the speed in miles at which the vehicle, engine, or locomotive is traveling.

It will of course be understood that the speed-indicating device is applicable to any rotary shaft or axle, and it will be also understood that the indicating device as a whole is susceptible of changes in the form, proportions, and minor details of construction, which may accordingly be resorted to without departing from the principle or sacrificing any of the advantages of the invention.

Having thus fully described the invention, what is claimed as new is—

1. A speed-indicator, comprising a gear, a worm-shaft driven thereby, a governor on the worm-shaft, a runner supported above the governor, said runner being operated by, but without connection with the governor, a dial, a hand or pointer, and a rack geared to the pointer and actuated by the runner.

2. A speed-indicator, comprising a gear, a worm-shaft driven thereby, a governor on the worm-shaft, a runner supported by but disconnected from the governor, said runner being forced upward in the operation of the governor, a dial, and a plurality of pointers geared to and actuated by the runner.

3. A speed-indicator, comprising a gear, a worm-shaft driven thereby, a governor on the worm-shaft, a runner controlled by the governor, a presser-bar bearing against the runner, a tension device for regulating the pressure of said bar, and a hand or pointer geared to and actuated by the runner.

4. A speed-indicator, comprising a gear, a worm-shaft driven thereby, a governor on the worm-shaft, a runner controlled by the governor, a presser-bar bearing against the runner, a tension-spring acting on the presser-bar, a tension-screw for regulating the pressure of the spring, a dial, and a hand or pointer geared to and actuated by the runner.

5. A speed-indicator, comprising a gear, a worm-shaft driven thereby, a governor on the worm-shaft, a runner disconnected from the governor but operated thereby in an upward direction, a guide permitting the runner to move lengthwise of the worm-shaft while preventing the rotation of the same, a tension device acting on the runner, a dial, and a hand or pointer geared to and actuated by the runner.

6. A speed-indicator, comprising a gear provided with a hub, a projection on said hub, a supporting-frame comprising grooved sections which embrace the hub of the gear and receive said projection, a worm-shaft driven by said gear, a governor on said shaft, a runner controlled by the governor, a dial, and a hand or pointer geared to and actuated by the runner.

7. A speed-indicator, comprising a gear provided with a sectional hub, a supporting-frame comprising a sectional band embracing the hub of the gear and provided with a groove in its inner face, a projection or key on the gear-hub working in said groove, a worm-shaft driven by said gear, a governor on the worm-shaft, a runner controlled by the governor, a dial, and a hand or pointer geared to and actuated by the runner.

8. A speed-indicator, comprising a sectional gear, a supporting-frame embodying a sectional gear-retaining band or boxing, a worm-shaft driven by said gear, a governor on said shaft, a runner controlled by the governor, a dial, a rack-bar attached to and movable with the runner, a plurality of hands or pointers operating across the face of the dial, and gearing interposed between said pointers and rack-bar, substantially as and for the purpose described.

In testimony whereof I affix my signature in presence of two witnesses.

JAMES E. HADLEY.

Witnesses:
P. WILLIAMS,
THOMAS LORENZEN.